United States Patent

Pevic

[11] 3,797,846
[45] Mar. 19, 1974

[54] TOW BAR

[76] Inventor: William V. Pevic, 3185 S. 40th Ave., R.R. No. 3, Shelby, Mich. 49455

[22] Filed: June 23, 1972

[21] Appl. No.: 265,532

[52] U.S. Cl. ................ 280/24, 180/5 R, 280/493
[51] Int. Cl. ............................................. B60d 1/14
[58] Field of Search ............ 280/24, 493, 494, 478, 280/482; 180/5 R

[56] References Cited
UNITED STATES PATENTS

| | | | |
|---|---|---|---|
| 1,536,751 | 5/1925 | Barnes | 280/482 |
| 2,507,265 | 5/1950 | Patton | 280/494 |
| 2,743,118 | 4/1956 | Dotson | 280/478 R |
| 2,795,435 | 6/1957 | Ortiz et al. | 280/493 X |

OTHER PUBLICATIONS
Hall Distributing Co., 1972-1973, Snowmobile Catalog, 180/5, page 19 and cover (front & inside), published Oct. 1972, Tow Bar foto.

*Primary Examiner*—Leo Friaglia
*Attorney, Agent, or Firm*—Price, Heneveld, Huizenga & Cooper

[57] ABSTRACT

A T-shaped clamping bar includes a cross member having adjustable clamps at opposite ends thereof for attaching the cross member to front portions of the skis of a snowmobile. A tongue is pivotably coupled at one end to the cross member and extends forwardly thereof. The opposite end of the tongue includes a swivel hitch adapted to be coupled to a towing vehicle. The towing bar structure thereby permits articulation and rotation between the towed and towing vehicles to accommodate uneven terrain.

6 Claims, 4 Drawing Figures

PATENTED MAR 19 1974 3,797,846
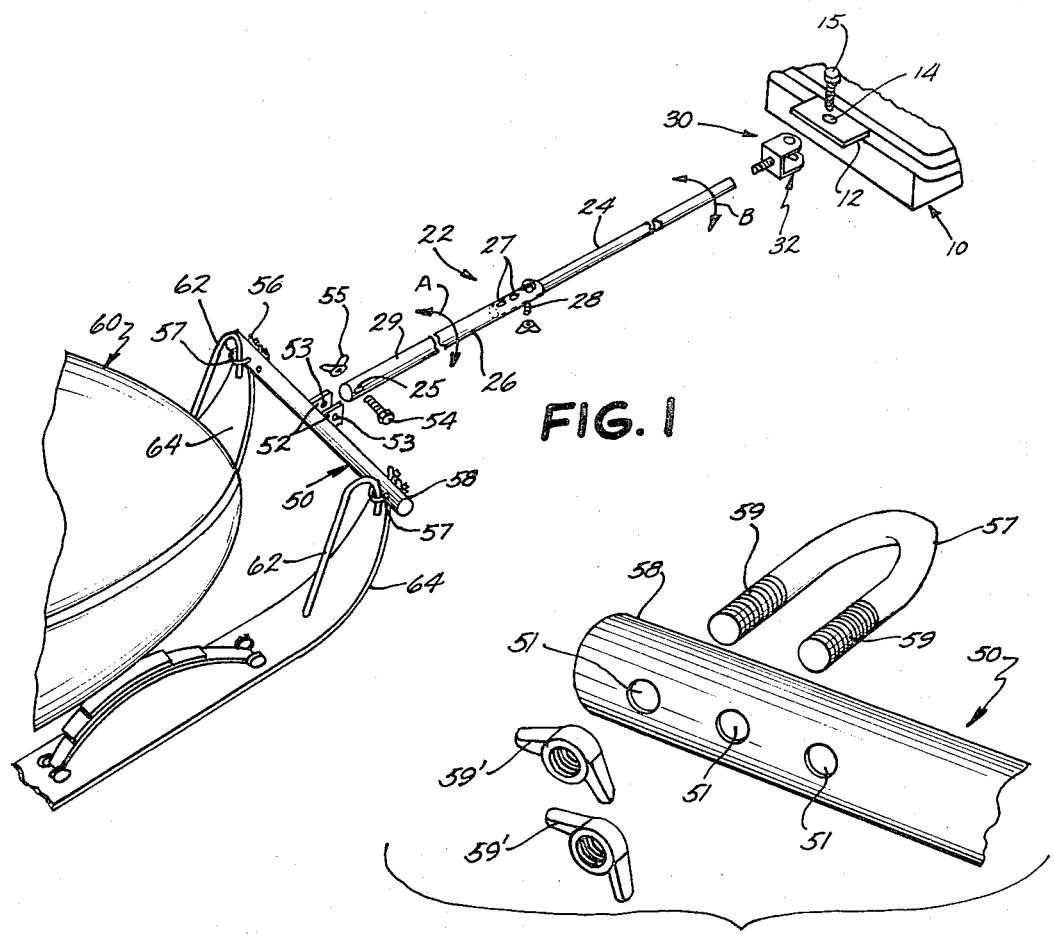
FIG. 1
FIG. 2
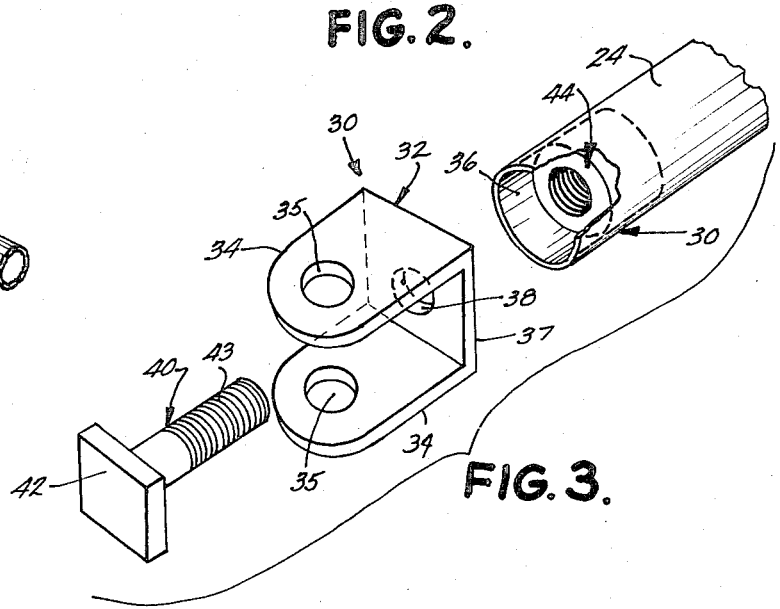
FIG. 4
FIG. 3

TOW BAR

BACKGROUND OF THE INVENTION

The present invention relates to tow bars and particularly to a tow bar which permits rotational motion between the towing and towed vehicles.

Snowmobiles occasionally suffer a mechanical failure when in use in remote snow covered locations not accessible to general land vehicles. In such cases, repairs must be made at the situs of the breakdown or the snowmobile must be towed to a carrying vehicle for transporting the snowmobile to a repair shop or other location where it can be repaired. When towing a disabled snowmobile, another snowmobile which is capable of reaching the remote location is usually employed.

Very frequently, it is difficult to tow a snowmobile with a tow rope because of the added weight of the rider necessary to control the towed machine. If the snow is ice covered, is thawing, or there is a heavy accumulation of new fallen snow and any uneven terrain is encountered, the added weight of the rider makes it impossible to tow the snowmobile with a rope since it lacks the necessary tensile strength. There exists, therefore, a need for a tow bar which couples to the towed snowmobile in such a manner that no rider is necessary to control the towed machine, and if necessary, the rider may be transferred to the towing snowmobile to give it more traction.

Currently, there are no known commercially available towing mechanisms or tow bars that are adapted for use with snowmobiles. It is generally known that a rigid coupling should be used between the snowmobiles since this prevents the towed vehicle from bumping against the towing vehicle when the towing vehicle comes to a sudden stop. In some instances, jury rigged structures can be fabricated to provide a rigid coupling when used together with a towing rope. Thus, it is sometimes possible to tow a snowmobile when a towing rope is carried on a snowmobile. It is impractical, however, to carry conventional tow bars on a snowmobile since the available storage space is quite limited.

Thus, there also exists a need for a rigid tow bar which can be easily carried on a snowmobile such that in the event of a mechanical breakdown at a remote area, one snowmobile can easily tow a disabled vehicle. Due to the uneven terrain which is frequently encountered when snowmobiling, the tow bar should, while providing a rigid coupling to prevent the snowmobiles from colliding, at the same time allow the towed snowmobile to follow the variations in the topography of the land without unnecessarily twisting or jerking against the towing vehicle. Thus, it is desired to provide a tow bar which accommodates tilting or rotation and vertical motion or articulation of the towed vehicle with respect to the towing vehicle.

It is an object of the present invention, therefore, to provide a tow bar for a snowmobile which can easily be carried on a snowmobile.

It is an additional object of the present invention to provide a tow bar which permits rotational motion between the towing and the towed vehicles.

It is still a further object of the present invention to provide a tow bar having a cross member which can be attached to the skis of a snowmobile and which is adjustable for a different spacing between skis.

These and other objects of the present invention will become apparent upon reading the specification together with the following figures.

BRIEF DESCRIPTION OF THE DRAWINGS

FIG. 1 is a fragmentary perspective view partially exploded showing a tow bar embodying the present invention;

FIG. 2 is an enlarged front perspective view of an adjustable clamp employed to couple the cross arm of the tow bar to the skis of a snowmobile or the like;

FIG. 3 is an enlarged exploded view of the swivel hitch employed for coupling the tow bar to the towing vehicle; and FIG. 4 is a partial perspective view of an alternative embodiment of the present invention.

DETAILED DESCRIPTION OF THE PREFERRED EMBODIMENT

Referring now to the figures, there is shown a rear plate 10 (FIG. 1) of a towing snowmobile which includes a hitch plate 12 extending horizontally and rearwardly therefrom. Plate 12 includes an aperture 14 therein for receiving a hitch pin 15. Nearly all snowmobiles include either this type of hitch plate or a functional equivalent. The tow bar 20 of the present invention includes a tongue 22 which includes a forward tubular section 24 telescopically fitted at an adjustable position within a tubular rear section 26 by means of a plurality of spaced apertures 27 through the front end of section 26 and the rear of section 24. A cross pin 28 is securely fitted between the sections during use by a wing nut 29 to rigidly couple the sections at the desired adjusted length.

At the front end of the forward section 24 there is provided a swivel hitch 30 (FIGS. 1 and 3) comprising a clevis 32 having a pair of frontal segments 34 extending from a vertical end wall 37. The segments are spaced to span plate 12 of the snowmobile 10 and each segment includes an aperture 35 therethrough to permit the tow bar to be hitched to the towing snowmobile by means of the hitch pin 15.

The clevis is rotatably attached to the front end of arm 24 of the tongue by means of a bolt 40 with a square head 42 and threaded shank 43. The head of the bolt is dimensioned to snugly fit between the frontal segments 34 to prevent rotation of the bolt within the clevis once the shank 43 is inserted through the aperture 38 in the clevis end wall 37. A nut 44, threaded to receive the shank 43 of bolt 40, is fitted within open end 36 of the front arm 24 of the tongue and brazed or otherwise securely attached therein. During installation, bolt 40 is threaded into the corresponding nut 44 in loose engagement to permit rotation of the clevis relative to the forward arm 24.

A cross arm 50 is attached to the end 29 of the rear section 26 of the tongue by means of a pair of forwardly extending and vertically oriented flanges 52, each having an aperture 53 therein. The flanges are spaced to permit the end of the rear section 26 to fit therebetween and allow a locking bolt 54 with an associated wing nut 55 to extend between apertures 53 and a corresponding aperture 25 in member 26. This coupling permits the articulation of the tongue 22 about the cross member in a direction indicated by the arrow A (FIG. 1).

Opposite ends 56 and 58 of arm 50 are securely attached to loops 62 attached to the skis 64 of a snowmobile 60 being towed by a pair of U-shaped bolts 57 (FIG. 2) having threaded ends 59 which are fitted to the ends of the cross bar 50 by means of a plurality of spaced apertures 51 provided therein. The bolts are secured to the cross bar at the desired spacing with respect to loops 62 by means of wing nuts 59'. It is noted that the cross arm can be used separately to couple the skis together in the event one of the tie rods coupling each ski to the steering mechanism breaks. In such case, the snowmobile can still be steered using the unbroken tie rod and the cross member 50.

When the towed vehicle 60 is coupled to the towing vehicle, the clevis permits rotation or twisting motion of the towed vehicle in a direction indicated by the arrow B as it travels over uneven terrain. The pivot connection between the tongue 22 and the cross member 50 permits articulation between the vehicles. By providing such relative motion between the vehicles, relatively uneven terrain can be traveled by the vehicles without fatiguing the tow bar or couplings to the vehicles due to stresses resulting from tilting of the vehicles as they pass over bumps or the like. The swivel hitch will, for example, permit tilting angles between the vehicles in excess of 45°.

In the embodiment shown in FIGS. 1 through 3, the tow bar can be disassembled into three relatively short segments for easy storage and carrying on a snowmobile. If desired, however, where such convenience is not required, the rear member 26 can be welded or brazed to cross member 50 as shown in FIG. 4 at 51. Articulation between the vehicles in this embodiment can be achieved by loosely attaching clamps 57 to the ski loops of the towed vehicle. It will be apparent to those skilled in the art that various other modifications of the present invention can be made without departing from the spirit or scope of the present invention as defined by the appended claims.

What is claimed is:

1. A tow bar comprising a cross member having fastening means on opposite ends thereof for attaching said cross member to a first vehicle wherein each end of said cross member includes a plurality of apertures formed therein and wherein said fastening means comprises a pair of U-shaped clamps, each having a pair of legs adapted to fit within said apertures in said cross arm to grip a member of a first vehicle between said cross arm and said clamps, a tongue having one end pivotally coupled to said cross member between said fastening means for vertical swinging movement therebetween, an opposite end of said tongue having a swivel hitch thereon for providing rotational movement about a longitudinal axis between said tongue and said hitch which is adapted to be pivotally coupled to a second vehicle for movement about a vertical pivot axis, said swivel hitch comprising a clevis with a pair of frontal segments extending from a wall therebetween, said wall including an aperture for receiving a bolt with a head which fits between said frontal segments to prevent rotation of the bolt relative to the clevis, and wherein said tongue includes a threaded nut rigidly attached to said other end of said tongue for receiving said bolt.

2. The apparatus as defined in claim 3 wherein said one end of said tongue includes an aperture therethrough and wherein said pivotal coupling between said tongue and said cross arm comprises a pair of flanges extending from said cross arm and including apertures therein, and pin means extending through said flanges and said tongue.

3. A T-shaped towing bar adapted to be coupled between first and second snowmobiles for providing a rigid coupling therebetween which permits tilting and articulation of the snowmobiles relative to one another as the snowmobiles travel over uneven terrain, said tow bar comprising:
   a tongue member having two sections telescopically fitted within one another and rigidly securable to each other;
   a cross member pivotally coupled to one end of said tongue for articulation about an axis transverse to the longitudinal axis of said tongue, said cross member including fastening means at opposite ends of said cross member for attaching said cross member to a first vehicle; and
   a clevis pivotally coupled to an opposite end of said tongue for articulation about a longitudinal axis of said tongue and adapted to be pivotally coupled to a towing vehicle for articulation about a vertical axis relative to the vehicle.

4. The apparatus as defined in claim 3 wherein said cross member is removably coupled to said tongue.

5. The apparatus as defined in claim 4 wherein said tongue comprises a first tubular member adapted to fit within a second tubular member and be fixedly positioned thereto by means of apertures extending through said members and a locking pin adapted to extend between said member within aligned apertures therein.

6. The apparatus as defined in claim 5 wherein said means for attaching said clevis to said opposite end of said tongue comprises a bolt having a head snugly fitted between frontal segments of said clevis and a threaded shank extending through an end wall of said clevis, and a nut rigidly fastened to said opposite end of said tongue and adapted to receive said threaded shank.

* * * * *